United States Patent

[11] 3,565,015

[72] Inventor Henry Jorgensen
       1225 Sheffield Ave., Dyer, Ind. 46311
[21] Appl. No. 789,138
[22] Filed Jan. 6, 1969
[45] Patented Feb. 23, 1971

[54] DOUGH PRESS
     6 Claims, 10 Drawing Figs.
[52] U.S. Cl.................................................... 107/15
[51] Int. Cl..................................................... A21c 9/00
[50] Field of Search......................................... 107/15,
        1(.5), 3, 4, 4(.2), 15(.9), 16, 17, 18; 100/93 (P)

[56] References Cited
     UNITED STATES PATENTS

| | | | |
|---|---|---|---|
| 2,078,189 | 4/1937 | Bemis........................... | 107/1(.5)X |
| 2,686,552 | 8/1954 | Faeber et al................. | 100/93(P)X |
| 2,726,707 | 12/1955 | Wellons et al.............. | 100/93(P)X |
| 3,124,083 | 3/1964 | Atwood........................ | 107/15(.9) |
| 3,207,062 | 9/1965 | Van Hartesveldt et al. .. | 100/93(P) |
| 3,411,461 | 11/1968 | Groth.......................... | 107/15(.9) |

Primary Examiner—Walter A. Scheel
Assistant Examiner—Arthur O. Henderson
Attorney—Benjamin Schlosser ABSTRACT: A dough press comprises a conveyor belt for carrying a series of pieces of dough between two horizontally disposed heated platens in vertical alignment. The upper platen is reciprocated vertically by a hydraulic system controlled by a motor wired into one electrical circuit. A die mounted on the bottom of the upper platen engages the conveyor belt to confine the dough to a specific size and shape as it is pressed and heated by the platens. The conveyor belt is moved intermittently by a motor wired into a second electrical circuit. The second circuit is closed by the vertical movement of the upper platen and is opened by an electric eye assembly operating through longitudinally spaced apertures in the conveyor belt. The two circuits are interlocked to prevent movement of the conveyor belt except during the upward movement of the lower platen.

PATENTED FEB 23 1971
3,565,015
SHEET 1 OF 4
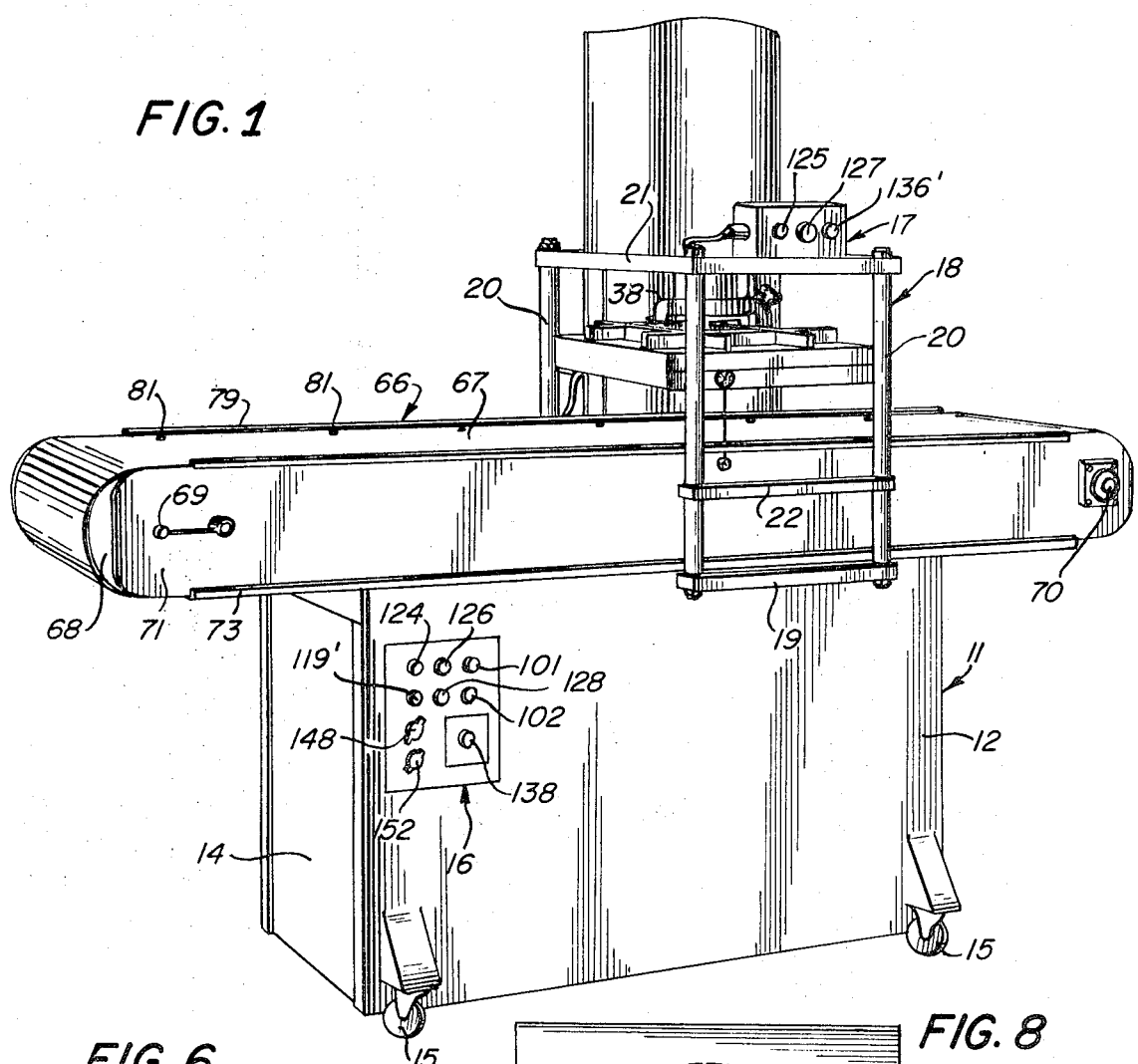
FIG. 1
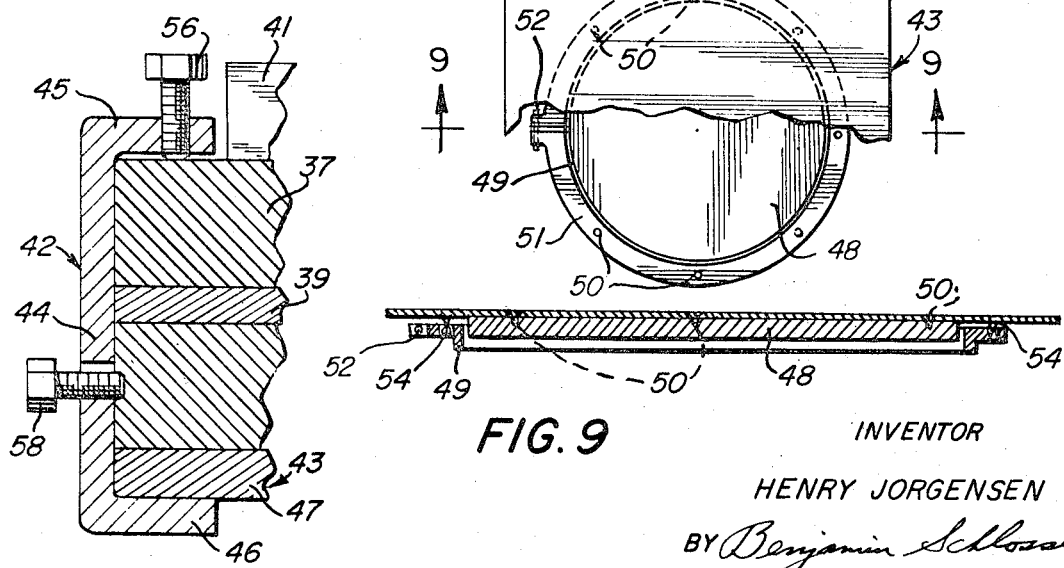
FIG. 6
FIG. 8
FIG. 9
INVENTOR
HENRY JORGENSEN
BY Benjamin Schlosser
ATTORNEY

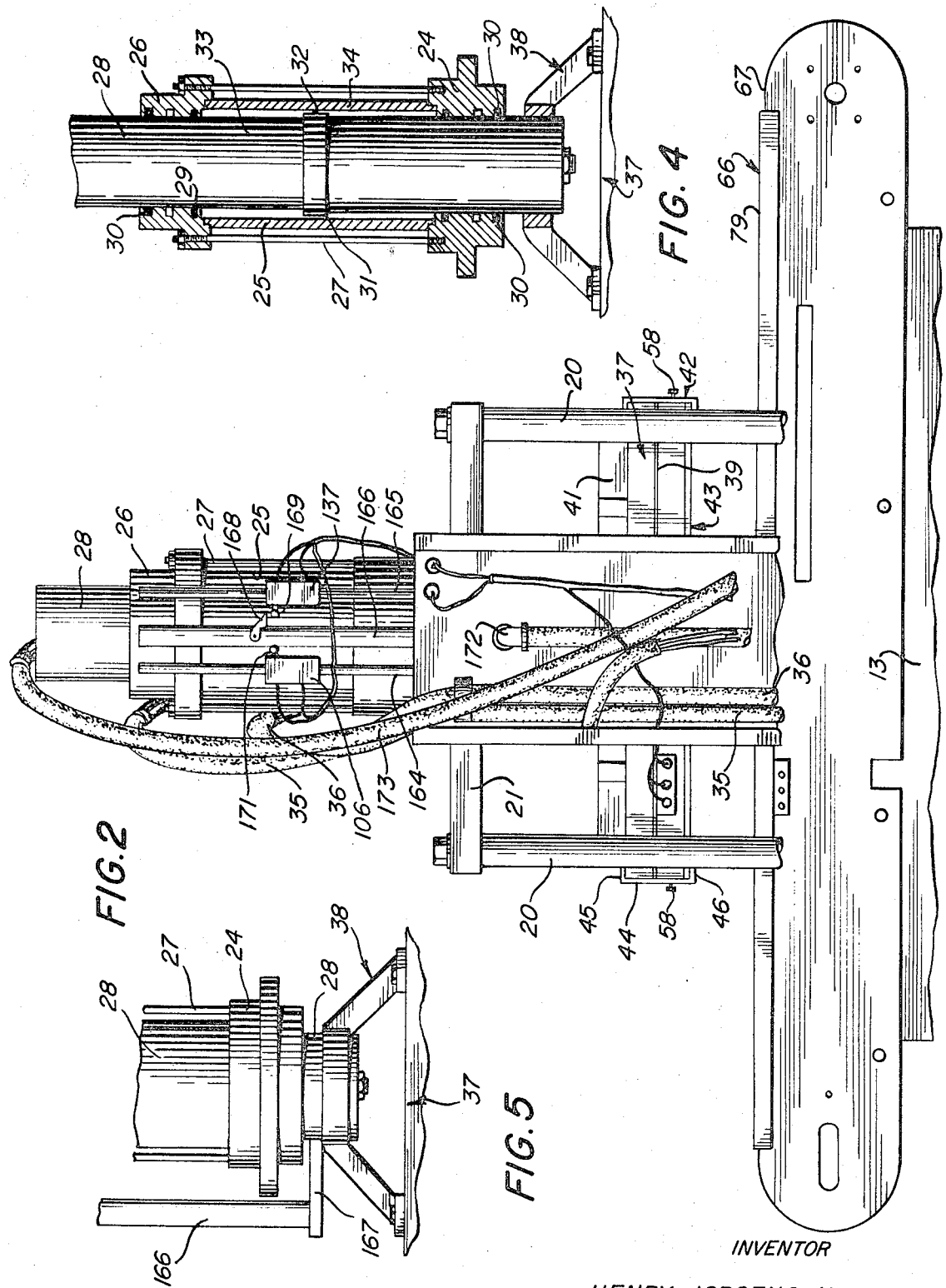

INVENTOR
HENRY JORGENSEN
BY Benjamin Schlosser
ATTORNEY

DOUGH PRESS

This invention relates to a dough press, and is particularly concerned with means for rapidly pressing individual pieces of dough into a desired shape, such as for a pizza, and partially baking them, during short pauses in the movement of an endless conveyor belt on which the pieces of dough are positioned, to facilitate handling the dough pieces during subsequent operations.

Suitable structure by means of which the above mentioned and other advantages of the invention are attained is described in the following specification, taken in conjunction with the accompanying drawings showing a preferred embodiment of the invention, in which:

FIG. 1 is a fragmentary perspective view of a dough press embodying the invention;

FIG. 2 is a fragmentary rear elevational view of the press;

FIG. 4 is an enlarged fragmentary vertical sectional view of the piston for moving the upper platen of the press;

FIG. 5 is an enlarged fragmentary side elevational view showing the support means for the upper platen, with portions of the structure omitted to clarify the illustration;

FIG. 6 is an enlarged fragmentary cross-sectional view of the upper platen showing the frame for holding the die;

FIG. 8 is a bottom plan view of the die;

FIG. 9 is a cross-sectional view taken in the plane indicated by the line 9–9 of FIG. 8.

Figure 3:
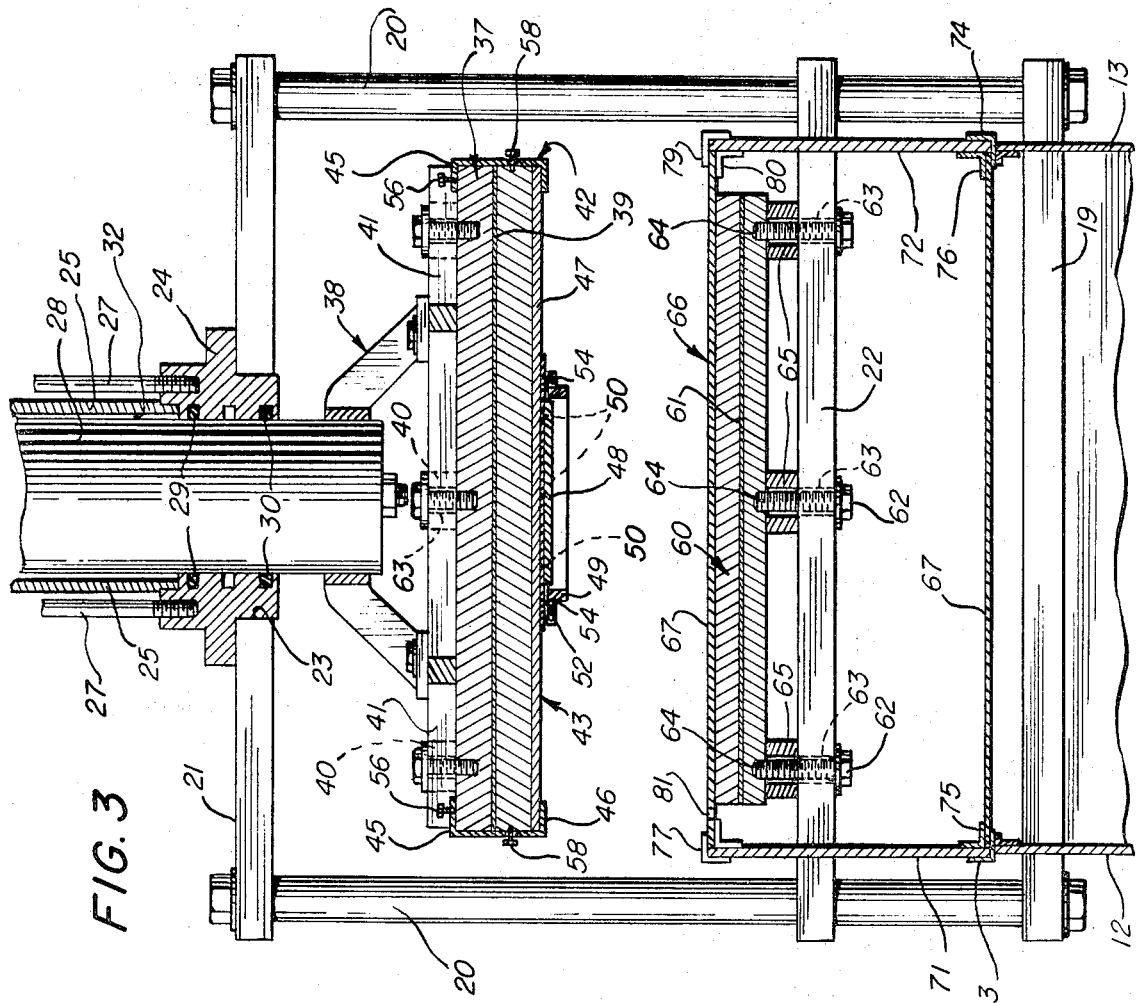
FIG. 3 is an enlarged fragmentary vertical sectional view of the press.

Referring to the drawings, a cabinet 11 comprises a front wall 12, a backwall 13, and two end walls 14. A plurality of retractable casters 15 are mounted adjacent the corners of the cabinet, and a control panel 16 is mounted on the front wall. A second control panel 17 is mounted on a support frame 18. The support frame 18 comprises a flat baseplate 19, a plurality of uprights 20 adjacent each corner of the baseplate, a top plate 21 mounted on the upper ends of the uprights 20, and an intermediate plate 22 supported on the uprights in parallel relationship to the top and bottom plates. The upper edges of the front and back walls of the cabinet 11 are cutaway to seat the baseplate 19 slightly below the level of the upper edges of the cabinet walls. The top plate 21 is provided with a centrally disposed opening 23 in which an annular collar 24 is mounted. The collar 24 supports the lower end of a cylindrical sleeve 25. Another annular collar 26, mounted on the upper end of the sleeve 25, is secured to the collar 24 by vertically disposed rods 27.

Figure 10:
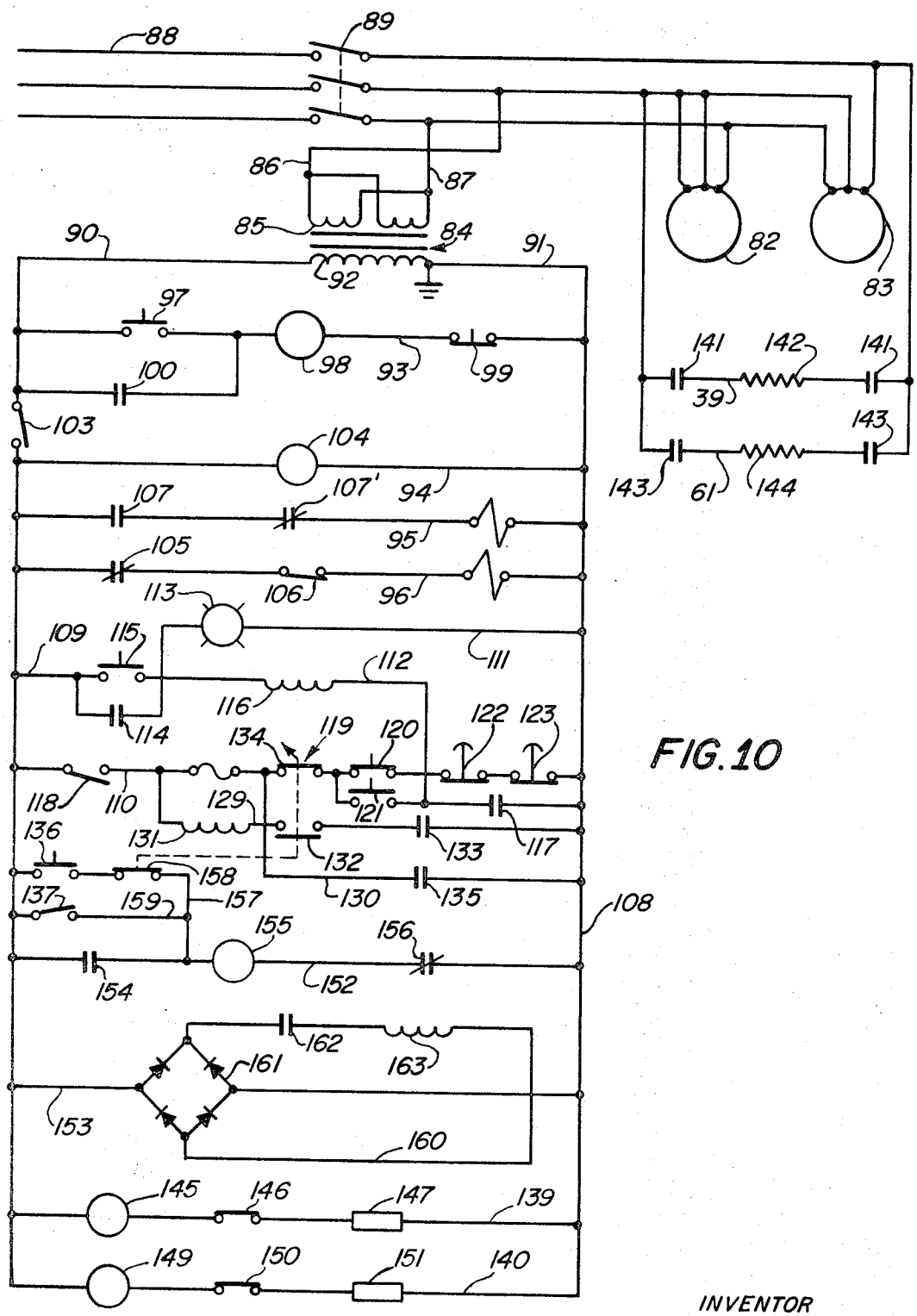
FIG. 10 is a schematic wiring diagram for the electrical system.

A tubular piston 28 is slidably mounted in the sleeve 25 and projects beyond both collars 24 and 26. Each collar has a pair of O-rings to provide an oil seal 29 and a wiping seal 30 between it and the outer surface of the piston 28. The piston has a circumferential flange 31 intermediate its length, and a piston ring 32 on the flange provides a sliding seal with the inside of the sleeve 25 to provide an upper chamber 33 and a lower chamber 34. As shown in FIG. 4, the surface area of the top of the flange 31 is greater than the surface area on the bottom of the flange because more force is required to drive the piston downwardly than to move it upwardly. The piston is reciprocated by a hydraulic system that includes a conduit 35 for the flow of oil into and out of the upper chamber 33, and a conduit 36 for the flow of oil into and out of the lower chamber. The direction of the flow of oil is regulated by a conventional electrically controlled valve (not shown). The circuitry for operating the valve is shown schematically in FIG. 10 and will be hereinafter described.

The lower end of the piston 28 is secured to an upper platen 37 in any suitable manner, as, for example, by a frog 38 that is bolted to the top of the upper platen. The upper platen contains a thermostatically controlled heating element 39 and is spaced from the frog by insulating members 40. The members 40 may be flat rings or sleeves of asbestos or other suitable insulating material capable of preventing conduction of excessive heat from the upper platen to the lower end of the piston. The upper platen is preferably provided with a plurality of reinforcing ribs 41 on its top surface. A skeletal frame 42 is mounted on the upper platen to hold a die 43 against the bottom surface of the upper platen. The frame 42 comprises a channel member having a vertically disposed sidewall 44, a top flange 45 and a bottom flange 46. The channel member is bent to form three sides of a rectangle with the flanges 45 and 46 extending inwardly of the rectangle. The die 43 comprises a flat baseplate 47 having a centrally disposed cylindrical portion 48 depending from its lower surface. A split ring 49 encircling the cylindrical portion 48 and spaced uniformly therefrom is secured to the plate 47 by bolts 50 that extend through apertures in the flange 51 of the ring. The split ring is provided with parallel lips 52 projecting from its split ends, and a screw 53 secures the ends of the rings together. Springs 54 encircling the bolts 50 between the flange 51 and the plate 47 urge the ring 49 downwardly so that the lower edge of the ring is normally below the bottom of the cylindrical portion 48 of the die. Each of a plurality of plates 47 is provided with a centrally disposed depending portion 48 of a different size and a properly sized split ring 49, and the various dies may be interchanged to enable the dough press to press each piece of dough to a desired size.

The frame 42 is mounted on the upper platen with the flange 45 resting on the top surface of the upper platen along three edges of the platen, and the flange 46 is spaced from the bottom surface of the upper platen a distance slightly greater than the thickness of the plate 47. The open side of the rectangular figure permits any plate 47 to be slid into position between the flange 46 and the bottom surface of the upper platen. The flange 45 has a plurality of threaded apertures 55, and screws 56, threaded into the apertures 55, are tightened against the top surface of the upper platen to hold the flange 46 tightly against the bottom surface of the platen. One edge of the upper platen is provided with a threaded aperture 57 to receive a screw 58, and the sidewall 44 of the frame 42 is provided with an elongated aperture 59. The aperture 57 is in register with the aperture 59. The aperture 59 is slightly wider than the diameter of the screw 58 to allow the frame 42 to drop a short distance relative to the upper platen when the screws 56 are loosened. This downward movement of the frame 42 provides the clearance between the platen and the frame necessary to permit the dies 43 to be slid into and out of place easily.

A stationary lower platen 60 is provided with a thermostatically controlled heating element 61 and is supported in vertical alignment with the upper platen by the intermediate plate 22. A plurality of screws 62 project through apertures 63 in the plate 22 and are screwed into threaded recesses 64 in the bottom surface of the lower platen. Insulating members 65 placed on each screw 62 above the top surface of the plate 22 space the lower platen from the plate 22 and prevent conduction of excessive heat from the lower platen to the plate.

A conveyor 66 for carrying pieces of dough between the heated upper and lower platens comprises an endless stainless steel belt 67 extending around a pair of rollers 68 rotatably mounted on shafts 69 and 70 adjacent and above opposite ends of the cabinet 11. The shafts are journaled in a pair of parallel vertically disposed plates 71 and 72 mounted on angle irons 73 and 74 rigidly secured to the upper edges of the front wall 12 and the rear wall 13, respectively. An angle iron 75 secured to the lower edge portion of the plate 71 in spaced relationship to the angle iron 73 cooperates with it to form a guide for one edge of the lower portion of the conveyor belt 67. The opposite edge of the conveyor belt is held and guided by an angle iron 76 secured to the lower edge portion of the plate 72 and the angle iron 74. One edge of the upper portion of the conveyor belt is guided by the angle irons 77 and 78 which are secured to the upper edge portion of the plate 71 and are spaced apart to confine the edge of the conveyor belt therebetween. The opposite edge of the upper portion of the conveyor belt is guided by the angle irons 79 and 80 which are similarly secured to the upper edge portion of the plate 72.

The upper portion of the conveyor belt extends over the top surface of the lower platen 60, so that the lower platen provides a rigid backing for the portion of the conveyor belt against which the dough is pressed. When the upper platen is moved downwardly to press the dough against the conveyor belt, the ring 49 engages the top surface of the conveyor belt to confine the dough laterally just before the dough is pressed downwardly by the depending portion 48 of the die 43. The springs 54 hold the ring 49 down against the conveyor belt for an instant after the upper platen starts its upward movement and imparts a stripping action to the ring. The conveyor belt 67 has a plurality of apertures 81 uniformly spaced longitudinally of the belt between the inner edge of the angle iron 78 and the adjacent edge of the lower platen 60 to enable them to cooperate with a photoelectric assembly, hereinafter described, to stop the conveyor belt so that it remains stationary during the dough pressing operation.

The mechanism of the dough press includes an electric motor 82 for pumping oil through the hydraulic system, and a second electric motor 83 for moving the conveyor belt 67. A timer, which is controlled by a switch 118, actuates the valve to direct the flow of oil into either the upper or lower chamber of the piston 28 so as to move the press downwardly or upwardly. The valve also directs the flow of oil out of the other chamber of the piston. The operation of the dough press will be understood more readily by reference to the wiring diagram shown schematically in FIG. 10.

In the diagram, a transformer 84 has its primary 85 connected by leads 86 and 87 to any suitable source of power, such as a powerline 88, through a disconnect switch 89. A pair of leads 90 and 91 are connected to opposite ends of the secondary 92. Four lines, 93, 94, 95, and 96, are each connected to the leads 90 and 91. The line 93 includes a normally open switch 97, a motor starter 98, a normally closed switch 99, and a normally open relay contact 100. The control panel 16 has a button 101 mounted thereon for closing the switch 97 and a button 102 for opening the switch 99. When the switch 97 is closed, the contact 100 seals it in the circuit and energizes the line 93 so that the motor starter 98 starts both motors 82 and 83. Both motors run continuously until the switch 99 or the disconnect switch 98 is opened. A normally open switch 103 in the lead 90 prevents immediate energization of any other circuit by closing of the switch 97. The continuous operation of both motors permits the cylinder 28 to be moved to its uppermost position and the conveyor belt to be jogged independently of the regular cycle of the press for reasons hereinafter disclosed.

The energization of the motor starter 98 closes the switch 103 to energize the line 94 in which a photoelectric assembly 104 is wired. The line 96, which actuates the valve to direct the flow of oil into the lower chamber of the piston, includes a normally closed relay contact 105 and a normally closed switch 106. Accordingly, the line 96 is energized instantly when the switch 103 is closed. The continuous operation of the motor 82 pumps the oil continuously so that it flows into the lower chamber of the piston to move the piston, and the upper platen attached thereto, upwardly as soon as the switch 103 is closed. This upward movement of the upper platen is advantageous as a safety feature of the press after any stop. The line 95, which actuates the valve to direct the flow of oil into the upper chamber to move the piston downwardly, is not energized by closing the switch 103 because of a normally open relay contact 107 wired into the line. The line 95 also has a normally closed relay contact 107' that interlocks the belt and cylinder controls to prevent the belt from moving as the piston 28 is moving downwardly.

All other lines having one end connected to the lead 90 have their other ends connected to a line 108 which is connected to the lead 91 through a control circuit that will now be described. The control circuit comprises two lines 109 and 110 each having one end connected to the lead 90. The line 109 has two branches 111 and 112 connected respectively to the lead 91 and the line 108. The line 111 has a pilot light 113 and a relay contact 114. The line 112 has a cycle reset switch 115, a relay coil 116, and a normally open contact relay 117. A button 128 is mounted on the control panel 16 for closing the switch 115 which is sealed in the circuit by the contact 114. Closing the switch 115 closes the contact 117, thereby lighting the pilot light and energizing the clutch assembly circuit and the heater circuits hereinafter described.

The line 110 has the timer switch 118, a manual-automatic switch 119, two cycle starter switches 120 and 121, and two emergency stop switches 122 and 123. The cycle starter switches 120 and 121 are in parallel, and the two emergency stop switches are in series. The cycle starter switch 120 is closed by pressing a button 124 mounted on the control panel 16, and the cycle starter switch 121 is closed by pressing a button 125 mounted on the control panel 17. Since these cycle starter switches are wired in parallel, the cycle may be started from either control panel. The emergency stop switch 121 is closed by pressing the button 126 mounted on the control panel 16, and the emergency stop switch 122 is closed by pressing the button 127 mounted on the control panel 17. Since the emergency stop switches are wired in series, the press may be stopped from either control panel. After any emergency stop, a button 128 on the control panel 16 is pressed to close the cycle reset switch 115 to reenergize the pilot light, the clutch assembly circuit and the heater circuits. The line 110 has two branch lines 129 and 130, each of which has one end connected to the line 110 between the timer switch 118 and the manual-automatic switch 119, and the other end connected to the line 108.

The line 129 has a relay coil 131, a contact plate 132 for the automatic position of the switch 119, and a contact 133 for the photoelectric assembly 104. The contact plate 132 is in parallel to a contact plate 134 that is wired in the line 110 for the manual position of the switch 119. The press is always started with the switch 119 in manual position. If nothing else is done, the press will operate through one cycle and then stop. The cycle starter switch button 124 or 125 must be pressed again to operate the press through another single cycle. The single cycle operation is desirable when the press is being cleaned or adjusted. If automatic operation is desired, the manual-automatic switch remains in manual position until the cycle starter switch button 124 or 125 is pressed, and is moved to its automatic position by turning a knob 119' on the control panel 16 before the press completes its cycle. The press will then run continuously until it is stopped by opening the switch 99, one of the emergency switches 121 or 122, or the disconnect switch 89.

The timer switch 118 is closed when the piston 28 starts its downward movement, and a relay contact 135 wired in the line 130 holds the timer switch 118 closed. The piston 28 cannot be moved upwardly and the belt conveyor 67 cannot be moved while the timer switch remains closed. The timer switch may be opened by expiration of its time period, or by opening either emergency stop switch 122 or 123. The normal time period for the switch 118 is regulated by an adjusting knob 138 mounted on the control panel 16. The time period is long enough to allow the dough to be partially baked, as it is pressed between the upper and lower platens, before the upper platen starts its upward movement.

The heater circuit, which is energized by the contact 117, includes the heaters 39 and 61 and the heater control lines 139 and 140. Each of the lines 139 and 140 has one end connected to the lead 90 and its other end connected to the line 108. The heater 39 has normally open relay contacts 141 on opposite sides of its heating element 142, and the heater 61 has normally open relay contacts 143 on opposite sides of its heating element 144. A contactor 145, for energizing the heater 39, is wired in the control line 139 which also includes a normally closed switch 146 and an adjustable thermostat 147. The thermostat 147 is actuated by a turn switch 148 that is mounted on the control panel 16. A contactor 149 for energizing the heater 61 is wired in the control line 140 which also includes a normally closed switch 150 and an adjustable thermostat 151. A turn switch 152, similar to the turn switch 148, is mounted on the control panel 16 to actuate the thermostat 151.

The belt control circuit comprises a line 152 and a clutch assembly line 153. Each of the lines 152 and 153 has one end connected to the lead 90 and its other end to the line 108. The line 152 includes a normally open relay contact 154, a relay coil 155, and a normally closed relay contact 156. The jogging switch 136 is wired in a branch line 157 connected at one end to the lead 90 and at its other end to the line 152 between the contact 154 and the coil 155. The jogging switch 136 is actuated by pressing a button 136' mounted on the control panel 17. Another switch 158 is wired in series in the line 157 and is operatively connected to the manual-automatic switch 119 so that it is closed when the switch 119 is in manual position and is open when the switch 119 is in automatic position. This wiring makes the jogging switch inoperative when the switch 119 is in automatic position. When the switch 119 is in manual position and the jogging switch is closed it energizes the clutch assembly circuit and moves the conveyor belt a small distance for adjustment or cleaning purposes.

The limit switch 137 is wired in another branch line 159 in parallel to the branch line 157 and also connected to the lead 90 and the line 152. The limit switch 137 is operated in the automatic position of the switch 119, in a manner hereinafter disclosed, to energize the clutch assembly circuit when it is closed. When the clutch assembly circuit is energized it actuates a conventional clutch mechanism to move the conveyor belt. When the conveyor belt moves far enough to align one of its apertures 81 with the photoelectric cell, the photoelectric assembly 104 is energized to open either switch 136 or 137 to stop movement of the conveyor belt.

The clutch assembly line 153 has a DC circuit 160 connected thereto through a bridge rectifier 161. The DC circuit includes a normally open relay contact 162 and a coil 163 for actuating the clutch mechanism for moving the conveyor belt.

Figure 7:
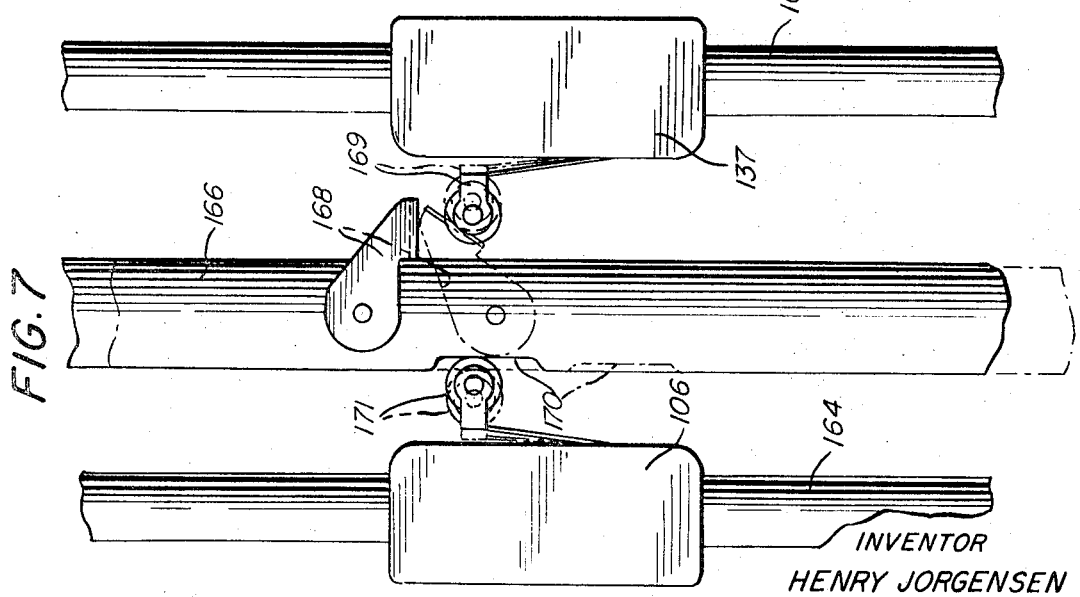
FIG. 7 is an enlarged fragmentary elevational view of the control mechanism of the press.

When the press is operating with the switch 119 in its automatic position the switches 106 and 137 are actuated automatically during each cycle of operation. The mechanism for operating these switches is shown in the uppermost position of the piston 28 in FIG. 7. The switch 106 is adjustably mounted on a stationary support rod 164 and the switch 137 is similarly mounted on a parallel support rod 165 spaced therefrom. A control rod 166, parallel to the rods 164 and 165 and positioned between them, has its lower end secured to an arm 167 projecting laterally from the piston 28 so that it moves vertically with the piston.

A finger 168 is pivotally mounted on the rod 166 and in its lowermost position extends horizontally toward the rod 165 to actuate the switch 137. As the piston 28 moves downwardly, the finger 168 engages a spring pressed contact arm 169 projecting from the switch 137 and is flipped upwardly about its pivot so that it does not actuate the switch. During this downward movement of the piston 28 the limit switch 137 is open and the conveyor belt 67 is stationary. As the control rod 166 approaches its uppermost position on the upward movement of the piston 28, the finger 168 engages the contact arm 169 and, since it cannot move pivotally downwardly, pushes the contact arm 169 inwardly to close the switch 137 to move the conveyor belt.

The control rod 166 has a notch 170 in its surface adjacent the switch 106. The switch 106 has a spring pressed contact arm 171 that is normally held in closed position by the peripheral surface of the rod 166. When the rod 166 reaches its uppermost position the notch 170 is aligned laterally with the contact arm 171. The arm 171 springs into the notch to open the switch 106 and thereby close the relay contact 107 to move the piston 28 downwardly.

When the dough press is being operated, the oil of the hydraulic system is heated by the motor and also by the piston which is heated by radiation from the upper platen. This heat will cause rapid deterioration of the oil seals 29 and 30. In order to prevent such deterioration, the piston 28 and the oil of the hydraulic system are both cooled by water flowing through a pipe 172 that extends through the hollow center of the piston. After the water has flowed through the piston it is flowed through a conduit 173 into a coil in the oil reservoir before it is flowed to waste.

Although a preferred embodiment of the invention has been described in considerable detail, it will be understood that the description thereof is intended to be illustrative, rather than restrictive, as many details of construction may be modified or changed without departing from the spirit or scope of the invention. Accordingly, I do not desire to be restricted to the exact structure described.

I claim:

1. A dough press comprising a stationary platen, an upper platen in vertical alignment with said stationary platen, means for heating said platens, means including a first electric motor for vertically reciprocating said upper platen whereby a piece of dough positioned between said platens may be shaped and partially baked to impart sufficient rigidity to the dough to facilitate subsequent handling, a pair of rollers rotatably mounted on opposite sides of said platens, an endless conveyor belt mounted on said rollers with one portion thereof between said platens, means including a second electric motor for moving said conveyor belt, and electrical means holding said conveyor belt against movement during the downward movement of said upper platen.

2. A dough press as recited in claim 1 and having a plurality of circuits associated with said motors, a first circuit being independent of the other circuits and including switch means for energizing both of said motors independently of said other circuits, a second circuit including a second switch means capable of energizing said second circuit only when said first circuit is energized, and said second circuit actuating a hydraulic mechanism to move said upper platen to its uppermost position immediately upon energization.

3. A dough press as recited in claim 1 and having a plurality of circuits associated with said motors, a first circuit being independent of the other circuits and including switch means for energizing both of said motors independently of said other circuits, a second circuit comprising one line adapted, when energized, to actuate a hydraulic mechanism for moving said upper platen upwardly, and a second line adapted, when energized, to actuate said hydraulic mechanism for moving it downwardly, said second circuit including a second switch means capable of energizing said second circuit only when said first circuit is energized, said one line including a normally closed switch and a normally closed relay contact whereby it is energized upon closing of said second switch means, and said second line including a normally open relay contact that closes when said normally closed switch is opened.

4. A dough press comprising upper and lower heated platens in vertical alignment, a reciprocable piston secured to one of said platens, a hydraulic system for reciprocating one of said platens, means including an electric motor for operating said hydraulic system, a conveyor belt for moving a piece of dough between said platens, means including a second electric motor for moving said conveyor belt, an electric circuit adapted to operate both of said motors, said second means including a second electrical circuit and a normally open switch preventing movement of said conveyor belt while in open position, and means for closing said switch as said reciprocating platen is moved upwardly, said switch in closed position energizing said second circuit to enable said second motor to move said conveyor belt.

5. A dough press as recited in claim 4, in which said first electrical circuit comprises one line adapted, when energized, to actuate said hydraulic system for moving the piston upwardly, a second line adapted to actuate said hydraulic system for moving the piston downwardly when said second line is energized, and means for energizing said second line, said means being operable only when said piston is in its uppermost position.

6. A dough press as recited in claim 4, in which said first electrical circuit includes a spring pressed normally closed switch mounted on a rod fixed in spaced relationship to said piston and said second electrical circuit includes a spring pressed normally open switch mounted on a rod in fixed parallel relationship to said first mentioned rod, a control rod movable with said piston is positioned between said two first mentioned rods, means on said control rod for permitting said normally closed switch to open when said piston reaches its uppermost position, and means on said control rod for closing said normally open switch as said piston approaches its uppermost position.